Aug. 18, 1931.         R. N. GIBSON         1,819,366
PISTON SPREADER
Filed Dec. 16, 1930
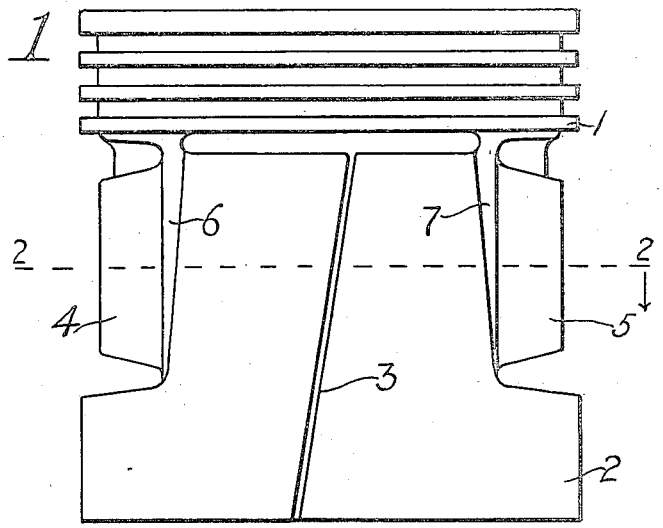
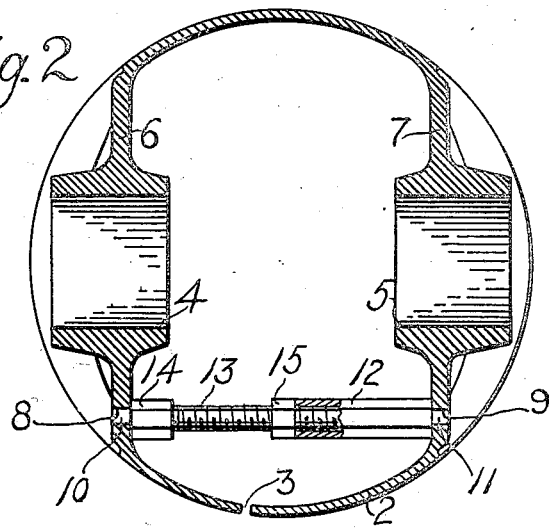
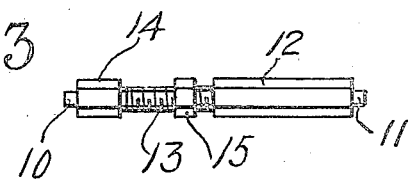
Inventor
Ross N. Gibson,
By Samuel H. Davis.
Attorney Patented Aug. 18, 1931

1,819,366

UNITED STATES PATENT OFFICE

ROSS N. GIBSON, OF LANSING, MICHIGAN

PISTON SPREADER

Application filed December 16, 1930. Serial No. 502,817.

This invention relates to piston spreaders and comprises an extension bolt or member having parts of special construction and operation, for the purpose of expanding any lynite or alloy piston or those of like type, fitted with split or slotted skirts of any configuration or design. It is an object of this invention to produce a spreader of the character described hereafter which will not hinder the expansion by heat or cause the distortion of the split skirt portion of the piston. It is believed that the use of this invention aids in keeping the piston at the required clearance contiguous to the cylinder wall by means of an easy adjustment as shown and explained, also allowing such adjustments in the assembled motor; that the same may be easily applied to practically all types of split skirt pistons, that it weighs less than one ounce, and may be installed in a few minutes even by an unskilful person.

The special construction constituting this invention is illustrated in the accompanying drawings, of which Fig. 1 represents a side view of the kind of piston to which the invention is applied. Fig. 2 is a sectional view on broken line 2—2 of Fig. 1. Fig. 3 is a side view of the spreader detached.

Throughout the drawings and description the same number is used to refer to the same part.

Considering the drawings, a piston 1 has the split or slotted skirt 2, the split being marked 3, and it has also the piston pin bearings 4 and 5 all of the customary pattern.

The pin bearings 4 and 5 are carried by vertical walls at the sides of the internal chamber of the piston and best shown in Fig. 2 marked 6 and 7. At oppositely located points those walls have orifices 8 and 9 adapted to receive the pintles 10 and 11 at the ends of the expansion or extension member. This extension member has an internally threaded sleeve 12, and the sleeve may be of any polygonal cross section. As shown it is hexagonal. The pintle 11 is on the end of the sleeve. A threaded core 13 enters the sleeve and has a hexagonal head 14 from which projects the pintle 10. The core carries a lock nut 15.

The operation of the invention is thought to be apparent from Fig. 2. The resilient portions of the split skirt 2 are separated as desired, and it will be noted that further expansion by heat only moves the orifices 8 and 9 on the pintles. There is no distortion. In Fig. 2 also it will be observed that the extension member can be applied while the motor is assembled. It is located at one side of the interior of the piston within easy reach by hand or tool. The lock nut fixes the adjusted position.

Having now described this invention and explained its use, I claim:—

1. A piston spreader comprising an extension member having a threaded sleeve provided at the end with a projecting pintle, a threaded core adapted to enter and engage the said sleeve, the said core having a head provided with a projecting pintle, and a lock nut on the said core adapted to be set up against the end of the said sleeve.

2. A piston spreader comprising an extension member having a threaded sleeve of polygonal cross section with a projecting pintle at the end of the sleeve, a threaded core adapted to enter and engage the said sleeve, the said core having a head of polygonal cross section provided with a projecting pintle, and a lock nut on said core adapted to be set up against the end of the said sleeve.

3. A piston having a wall consisting of separable resilient portions, in combination with a spreader comprising an extension member having a threaded sleeve provided at the end with a projecting pintle, a threaded core adapted to enter and engage the said sleeve, the said core having a head provided with a projecting pintle, a lock nut on the said core adapted to be set up against the end of the said sleeve, and the said resilient portions of the piston having oppositely located orifices adapted to receive the said pintles of the spreader.

4. A piston having a wall consisting of separable resilient portions, in combination with a spreader comprising an extension member having a threaded sleeve of polygonal cross section with a projecting pintle at the end of the sleeve, a threaded core adapted to enter and engage the said sleeve, the said core having a head of polygonal cross section provided with a projecting pintle, a lock nut on said core adapted to be set up against the end of said sleeve, and the said resilient portions of the piston having oppositely located orifices adapted to receive the said pintles of the spreader.

In testimony whereof I affix my signature.

ROSS N. GIBSON.